United States Patent
Kikuchi et al.

(10) Patent No.: US 8,864,961 B2
(45) Date of Patent: Oct. 21, 2014

(54) FLUORINE GAS GENERATING APPARATUS

(75) Inventors: Akiou Kikuchi, Ube (JP); Akifumi Yao, Ube (JP); Tatsuo Miyazaki, Ube (JP); Nobuyuki Tokunaga, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 95 days.

(21) Appl. No.: 13/520,237

(22) PCT Filed: Nov. 30, 2010

(86) PCT No.: PCT/JP2010/071338
§ 371 (c)(1),
(2), (4) Date: Jul. 2, 2012

(87) PCT Pub. No.: WO2011/083639
PCT Pub. Date: Jul. 14, 2011

(65) Prior Publication Data
US 2013/0008781 A1    Jan. 10, 2013

(30) Foreign Application Priority Data

Jan. 5, 2010   (JP) .................................. 2010-000532

(51) Int. Cl.
| | |
|---|---|
| C25B 9/00 | (2006.01) |
| C25B 1/24 | (2006.01) |
| C25B 15/08 | (2006.01) |
| C01B 7/20 | (2006.01) |
| F17C 7/04 | (2006.01) |

(52) U.S. Cl.
CPC . *C25B 1/245* (2013.01); *C25B 9/00* (2013.01); *C25B 15/08* (2013.01); *C01B 7/20* (2013.01); *F17C 7/04* (2013.01)
USPC ............................ 204/247; 205/411; 205/619

(58) Field of Classification Search
None
See application file for complete search history.

(56) References Cited

U.S. PATENT DOCUMENTS

| | | | | |
|---|---|---|---|---|
| 4,174,619 A | * | 11/1979 | Tocha ............................ | 62/50.2 |
| 4,175,395 A | * | 11/1979 | Prost et al. ..................... | 62/50.2 |

(Continued)

FOREIGN PATENT DOCUMENTS

| | | |
|---|---|---|
| JP | 2004-039740 A | 2/2004 |
| JP | 2004-043885 A | 2/2004 |

(Continued)

OTHER PUBLICATIONS

Machine translation of Ono (JP 2006-052880).*

(Continued)

*Primary Examiner* — Harry D Wilkins, III
(74) *Attorney, Agent, or Firm* — Westerman, Hattori, Daniels & Adrian, LLP

(57) ABSTRACT

A fluorine gas generating apparatus includes an electrolytic cell where the molten salt is retained and which is separated and divided above the liquid level of the molten salt into a first gas chamber where a product gas mainly containing a fluorine gas generated at an anode immersed in the molten salt is led and a second gas chamber where a byproduct gas mainly containing a hydrogen gas generated at a cathode immersed in the molten salt is led, and a refining device refining the fluorine gas by coagulating with a cooling medium and trapping a hydrogen fluoride gas evaporated from the molten salt in the electrolytic cell and mixed in the product gas generated from the anode. The cooling medium for coagulation of the hydrogen fluoride gas in the refining device and discharged is re-used as a utility gas used at spots in the fluorine gas generating apparatus.

4 Claims, 4 Drawing Sheets

(56) References Cited

U.S. PATENT DOCUMENTS

| | | | |
|---|---|---|---|
| 4,590,770 A * | 5/1986 | Howard | 62/50.2 |
| 2002/0074013 A1 | 6/2002 | Shang et al. | |
| 2005/0011766 A1* | 1/2005 | Tojo et al. | 205/81 |
| 2005/0252451 A1 | 11/2005 | Beppu et al. | |

FOREIGN PATENT DOCUMENTS

| | | |
|---|---|---|
| JP | 2004-174438 A | 6/2004 |
| JP | 2005-264231 A | 9/2005 |
| JP | 2006-052880 A | 2/2006 |
| JP | 2006-238570 A | 9/2006 |

OTHER PUBLICATIONS

Froning et al, Purification and compression of Fluorine, Industrial and Engineering Chemistry, vol. 39, No. 3, Mar. 1947, pp. 275-278.*
International Search Report for PCT/JP2010/071338, mailing date of Mar. 8, 2011.

* cited by examiner

US 8,864,961 B2

FLUORINE GAS GENERATING APPARATUS

BACKGROUND ART

The present invention relates to a fluorine gas generating apparatus.

As a prior-art fluorine gas generating apparatus, an apparatus which generates fluorine gas by electrolysis using an electrolytic cell is known.

JP2004-43885A discloses a fluorine gas generating apparatus provided with an electrolytic cell for electrolyzing hydrogen fluoride in molten salt containing hydrogen fluoride, generating a product gas mainly containing a fluorine gas in a first gas phase section on an anode side, and generating a byproduct gas mainly containing a hydrogen gas in a second gas phase section on a cathode side.

In this type of fluorine gas generating apparatus, a hydrogen fluoride gas evaporated from the molten salt is mixed in the fluorine gas generated from the anode of the electrolytic cell. Thus, it is necessary to refine the fluorine gas by separating hydrogen fluoride from the gas generated from the anode.

JP2004-39740A discloses an apparatus which cools a fluorine gas component and components other than the fluorine gas component and separates them by using a difference in a boiling point between the both.

SUMMARY OF THE INVENTION

In the apparatus for refining the fluorine gas as described in JP2004-39740A, liquid nitrogen or the like used as a cooling medium is emitted into the atmosphere in a process of refining and is not effectively used.

The present invention has been made in view of the above problem and has an object of effectively utilizing the cooling medium used in refining of the fluorine gas.

An aspect of the present invention is a fluorine gas generating apparatus which generates a fluorine gas by electrolyzing hydrogen fluoride in molten salt. The fluorine gas generating apparatus includes an electrolytic cell in which the molten salt is retained and which is separated and divided above the liquid level of the molten salt into a first gas chamber into which a product gas mainly containing a fluorine gas generated at an anode immersed in the molten salt is led and a second gas chamber into which a byproduct gas mainly containing a hydrogen gas generated at a cathode immersed in the molten salt is led, and a refining device which refines the fluorine gas by coagulating with a cooling medium and trapping a hydrogen fluoride gas evaporated from the molten salt in the electrolytic cell and mixed in the product gas generated from the anode. The cooling medium used for coagulation of the hydrogen fluoride gas in the refining device and discharged is re-used as a utility gas used at a spot in the fluorine gas generating apparatus.

According to the present invention, a cooling medium used for coagulation of a hydrogen fluoride gas in a refining device and discharged is re-used as a utility gas used in a spot in the fluorine gas generating apparatus, and thus, the cooling medium used for refining of the fluorine gas can be effectively used.

DESCRIPTION OF THE EMBODIMENTS

Figure 1:
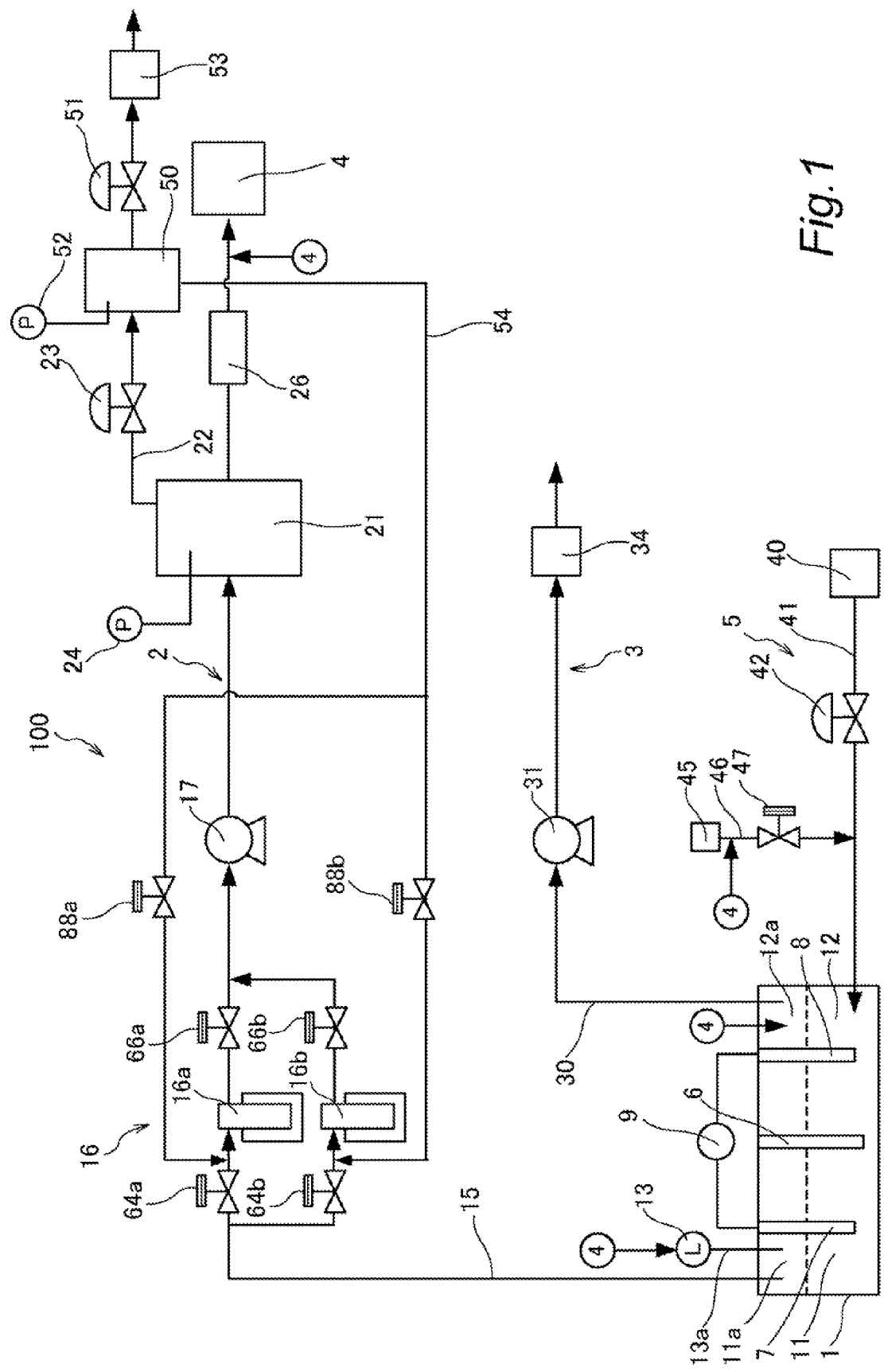
FIG. 1 is a system diagram illustrating a fluorine gas generating apparatus according to an embodiment of the present invention.

An embodiment of the present invention will be described below by referring to the attached drawings.

A fluorine gas generating apparatus 100 according to the embodiment of the present invention will be described by referring to FIG. 1.

The fluorine gas generating apparatus 100 generates a fluorine gas by electrolysis and supplies the generated fluorine gas to an external device 4. The external device is a semiconductor manufacturing device, for example, and in that case, the fluorine gas is used as a cleaning gas in a manufacturing process of a semiconductor, for example.

The fluorine gas generating apparatus 100 includes electrolytic cell 1 which generates a fluorine gas by electrolysis, a fluorine gas supply system 2 which supplies the fluorine gas generated from the electrolytic cell 1 to the external device 4, and a byproduct gas treatment system 3 which treats a byproduct gas generated with the generation of the fluorine gas.

First, the electrolytic cell 1 will be described. The electrolytic cell 1 retains molten salt containing hydrogen fluoride (HF). In this embodiment, a mixture (KF·2HF) of hydrogen fluoride and potassium fluoride (KF) is used as the molten salt.

The inside of the electrolytic cell 1 is divided by a partition wall 6 immersed in the molten salt to an anode chamber 11 and a cathode chamber 12. An anode 7 and a cathode 8 are immersed in the molten salt in the anode chamber 11 and the cathode chamber 12, respectively. By means of supply of an electric current between the anode 7 and the cathode 8 from a power supply 9, a product gas mainly containing a fluorine gas ($F_2$) is generated at the anode 7, while a byproduct gas mainly containing a hydrogen gas ($H_2$) is generated at the cathode 8. A carbon electrode is used for the anode 7, while soft iron, monel or nickel is used for the cathode 8.

Above the liquid level of the molten salt in the electrolytic cell 1, a first gas chamber 11a into which the fluorine gas generated at the anode 7 is introduced and a second gas chamber 12a into which the hydrogen gas generated at the cathode 8 is led are partitioned by a partition wall 6 from each other so that the gases cannot go out of or come into each other. As described above, the first gas chamber 11a and the second gas chamber 12a are completely separated by the partition wall 6 in order to prevent reaction by contact between the fluorine gas and the hydrogen gas. On the other hand, the molten salt in the anode chamber 11 and the cathode chamber 12 is not separated by the partition wall 6 but communicates with each other below the partition wall 6.

The melting point of KF·2HF is 71.7° C., and thus, the temperature of the molten salt is adjusted to 90 to 100° C. Hydrogen fluoride is evaporated from the molten salt by an amount of a vapor pressure and mixed in each of the fluorine gas and the hydrogen gas generated from the anode 7 and the cathode 8 of the electrolytic cell 1. As described above, a hydrogen fluoride gas is contained in each of the fluorine gas generated at the anode 7 and introduced into the first gas chamber 11a and the hydrogen gas generated at the cathode 8 and introduced into the second gas chamber 12a.

In the electrolytic cell 1, a liquid level meter 13 which detects a liquid level of the retained molten salt as a liquid level detector is provided. The liquid level meter 13 is a back-pressure type liquid level meter which detects a back pressure when a certain flow rate of the nitrogen gas is purged into the molten salt through an insertion pipe 13a inserted into the electrolytic cell 1 and detects a liquid level from the back pressure and a liquid specific weight of the molten salt.

Subsequently, the fluorine gas supply system 2 will be described.

A first main passage 15 for supplying the fluorine gas to the external device 4 is connected to the first gas chamber 11a.

A first pump 17 which leads the fluorine gas out of the first gas chamber 11a and conveys it is provided in the first main passage 15. A positive-displacement pump such as a bellows pump, a diaphragm pump or the like is used for the first pump 17.

A refining device 16 for trapping the hydrogen fluoride gas mixed in the product gas and, refining the fluorine gas is provided upstream of the first pump 17 in the first main passage 15. The refining device 16 is a device for separating and removing the hydrogen fluoride gas from the fluorine gas by using a difference in boiling points between fluorine and hydrogen fluoride. The refining device 16 is composed of two systems of a first refining device 16a and a second refining device 16b provided in parallel with each other and they can be switched so that the fluorine gas passes through only either one of the systems. That is, if one of the first refining device 16a and the second refining device 16b is in the operating state, the other is stopped or in the stand-by state. The refining device 16 will be described later in detail.

A first buffer tank 21 which retains the fluorine gas conveyed by the first pump 17 is provided downstream of the first pump 17 in the first main passage 15. The fluorine gas retained in the first buffer tank 21 is supplied to the external device 4.

A flow meter 26 which detects a flow rate of the fluorine gas supplied to the external device 4 is provided downstream of the first buffer tank 21. A power supply 9 controls a current value supplied between the anode 7 and the cathode 8 on the basis of a detection result of the flow meter 26. Specifically, a generation amount of the fluorine gas at the anode 7 is controlled so that the fluorine gas supplied to the external device 4 is replenished.

As described above, control is made so that the fluorine gas supplied to the external device 4 is replenished, and an internal pressure of the first buffer tank 21 is maintained at a pressure higher than the atmospheric pressure. On the other hand, since the external device 4 side where the fluorine gas is used is at the atmospheric pressure, by opening a value provided in the external device 4, the fluorine gas is supplied from the first buffer tank 21 to the external device 4 due to a pressure difference between the first buffer tank 21 and the external device 4.

A branch passage 22 is connected to the first buffer tank 21, and the pressure regulating valve 23 which controls the internal pressure of the first buffer tank 21 is provided in the branch passage 22. Moreover, a pressure meter 24 which detects the internal pressure is provided on the first buffer tank 21. The pressure regulating valve 23 controls the internal pressure of the first buffer tank 21 so that it does not exceed a predetermined pressure set in advance on the basis of a detection result of the pressure meter 24. Specifically, when the internal pressure of the first buffer tank 21 exceeds 1.0 MPa, the valve is opened so as to discharge the fluorine gas in the first buffer tank 21.

A second buffer tank 50 which retains the fluorine gas discharged from the first buffer tank 21 is provided downstream of the pressure regulating valve 23 in the branch passage 22. That is, if the internal pressure of the first buffer tank 21 exceeds the predetermined pressure, the fluorine gas in the first buffer tank 21 is discharged through the pressure regulating valve 23, and the discharged fluorine gas is led to the second buffer tank 50. The second buffer tank 50 has a capacity smaller than the first buffer tank 21.

A pressure regulating valve 51 which controls the internal pressure of the second buffer tank 50 is provided downstream of the second buffer tank 50 in the branch passage 22. Moreover, a pressure meter 52 which detects the internal pressure is provided on the second buffer tank 50. The pressure regulating valve 51 controls the internal pressure of the second buffer tank 50 on the basis of a detection result of the pressure meter 52 so that it becomes a predetermined pressure set in advance. The fluorine gas discharged from the second buffer tank 50 through the pressure regulating valve 51 is rendered harmless at an abatement unit 53 and emitted. A fluorine gas supply passage 54 which supplies the fluorine gas to the refining device 16 is connected to the second buffer tank 50.

Subsequently, the byproduct gas treatment system 3 will be described.

A second main passage 30 for discharging the hydrogen gas to the outside is connected to the second gas chamber 12a.

A second pump 31 which leads the hydrogen gas out of the second gas chamber 12a and conveys it is provided in the second main passage 30.

An abatement unit 34 is provided downstream of the second pump 31 in the second main passage 30, and the hydrogen gas conveyed by the second pump 31 is rendered harmless in the abatement unit 34 and emitted.

The fluorine gas generating apparatus 100 is also provided with a raw material supply system 5 which supplies hydrogen fluoride which is a raw material of the fluorine gas into the molten salt in the electrolytic cell 1. The raw material supply system 5 will be described below.

The raw material supply system 5 includes a hydrogen fluoride supply source 40 in which hydrogen fluoride to be replenished to the electrolytic cell 1 is retained. The hydrogen fluoride supply source 40 and the electrolytic cell 1 are connected through the raw material supply passage 41. The hydrogen fluoride retained in the hydrogen fluoride supply source 40 is supplied into the molten salt in the electrolytic cell 1 through the raw material supply passage 41.

A flow rate control valve 42 which controls a supply flow rate of hydrogen fluoride is provided in the raw material supply passage 41. The flow rate control valve 42 controls the supply flow rate of hydrogen fluoride on the basis of a detection result of the liquid level meter 13 so that the liquid level of the molten salt in the electrolytic cell 1 becomes a predetermined level. That is, the flow rate control valve 42 controls the supply flow rate of hydrogen fluoride so that the electrolyzed hydrogen fluoride in the molten salt is replenished.

Moreover, a carrier-gas supply passage 46 which leads a carrier gas supplied from a carrier-gas supply source 45 into the raw material supply passage 41 is connected to the raw material supply passage 41. A shut-off valve 47 which switches between supply and shut-off of the carrier gas is provided in the carrier-gas supply passage 46. The carrier gas is an entrained gas for leading the hydrogen fluoride retained in the hydrogen fluoride supply source 40 into the molten salt in the electrolytic cell 1, and a nitrogen gas which is an inactive gas is used. During operation of the fluorine gas generating apparatus 100, the shut-off valve 47 is open in principle, and the nitrogen gas is supplied into the molten salt in the cathode chamber 12 of the electrolytic cell 1. The nitrogen gas is hardly dissolved in the molten salt and discharged from the second gas chamber 12a through the byproduct gas treatment system 3.

Subsequently, the refining device 16 will be described by referring to FIG. 2.

Since the first refining device 16a and the second refining device 16b have the same configuration, the first refining device 16a will be mainly described below, and the same reference numerals are given to the same configurations in the second refining device 16b as those in the first refining device 16a, and the description will be omitted. The configurations of the first refining device 16a are suffixed by "a" and the configurations of the second refining device 16b are suffixed by "b" for discrimination.

The first refining device 16a includes an inner tube 61a as a gas inflow unit into which the fluorine gas containing the hydrogen fluoride gas flows and a cooling device 70a which cools the inner tube 61a at a temperature not lower than the boiling point of fluorine and not higher than the melting point of hydrogen fluoride so that the fluorine gas passes through the inner tube 61a while the hydrogen fluoride gas mixed in the fluorine gas is coagulated.

The inner tube 61a is a bottomed cylindrical member, and an upper opening thereof is sealed by a lid member 62a. An inlet passage 63a which leads the fluorine gas generated in the anode 7 into the inner tube 61a is connected to the lid member 62a of the inner tube 61a. The inlet passage 63a is one of two passages branching from the first main passage 15, and the other inlet passage 63b is connected to an inner tube 61b of the second refining device 16b. An inlet valve 64a which allows or shuts off inflow of the fluorine gas into the inner tube 61a is provided in the inlet passage 63a.

A conduit 67a provided by being suspended into the inner tube 61a is connected to the inner surface of the lid member 62a of the inner tube 61a. The conduit 67a is formed to have a length such that a lower end opening portion is located in the vicinity of the bottom part of the inner tube 61a. An upper end portion of the conduit 67a is connected to an outlet passage 65a connected to the lid member 62a and discharging the fluorine gas through the inner tube 61a. Therefore, the fluorine gas in the inner tube 61a flows out to the outside through the conduit 67a and the outlet passage 65a. An outlet valve 66a which allows or shuts off outflow of the fluorine gas from the inner tube 61a is provided in the outlet passage 65a. The outlet passage 65a merges with an outlet passage 65b of the second refining device 16b and is connected to the first pump 17.

As described above, the fluorine gas generated in the anode 7 flows into the inner tube 61a through the inlet passage 63a and flows out of the inner tube 61a through the conduit 67a and the outlet passage 65a.

If the first refining device 16a is in the operating state, the inlet valve 64a and the outlet valve 66a are open, while if the first refining device 16a is in the stop or standby state, the inlet valve 64a and the outlet valve 66a are closed.

A thermometer 68a which detects an internal temperature is provided in the inner tube 61a by being inserted through the lid member 62a. Moreover, a pressure meter 69a which detects the internal pressure of the inner tube 61a is provided in the inlet passage 63a.

The cooling device 70a includes a jacket tube 71a capable of partially containing the inner tube 61a and capable of retaining liquid nitrogen as a cooling medium therein and a liquid nitrogen supply/discharge system 72a which supplies/discharges liquid nitrogen to/from the jacket tube 71a.

The jacket tube 71a is a bottomed cylindrical member, and an upper opening portion is sealed by a lid member 73a. The inner tube 61a is coaxially contained in the jacket tube 71a in a state having the upper part side protruding from the lid member 73a. Specifically, 80 to 90% of the inner tube 61a is contained in the jacket tube 71a.

Subsequently, the liquid nitrogen supply/discharge system 72a will be described.

A liquid nitrogen supply passage 77a which leads the liquid nitrogen supplied from a liquid nitrogen supply source 76 into the jacket tube 71a is connected to the lid member 73a of the jacket tube 71a. A conduit 82a provided by being suspended into the jacket tube 71a is connected to the inner surface of the lid member 73a of the jacket tube 71a, and an upper end portion of the conduit 82a is connected to the liquid nitrogen supply passage 77a. Therefore, the liquid nitrogen supplied from the liquid nitrogen supply source 76 is led into the jacket tube 71a through the liquid nitrogen supply passage 77a and the conduit 82a. The conduit 82a is formed to have a length such that a lower end opening portion is located in the vicinity of the bottom part of the jacket tube 71a.

A flow rate control valve 78a which controls the supply flow rate of the liquid nitrogen is provided in the liquid nitrogen supply passage 77a. A pressure meter 80a which detects an internal pressure of the jacket tube 71a is provided downstream of the flow rate control valve 78a in the liquid nitrogen supply passage 77a.

The inside of the jacket tube 71a is formed of two layers, that is, the liquid nitrogen and evaporated nitrogen gas, and the liquid level of the liquid nitrogen is detected by a liquid level meter 74a provided by being inserted through the lid member 73a.

A nitrogen gas discharge passage 79a for discharging the nitrogen gas in the jacket tube 71a is connected to the lid member 73a of the jacket tube 71a. A pressure regulating valve 81a which controls the internal pressure of the jacket tube 71a is provided in the nitrogen gas discharge passage 79a. The pressure regulating valve 81a executes control such that the internal pressure of the jacket tube 71a becomes a predetermined pressure determined in advance on the basis of a detection result of the pressure meter 80a. This predetermined pressure is determined so that the temperature of the liquid nitrogen in the jacket tube 71a becomes not lower than the boiling point ($-188°$ C.) of fluorine and not higher than the melting point ($-84°$ C.) of hydrogen fluoride. Specifically, the pressure is set to 0.4 MPa so that the temperature of the liquid nitrogen in the jacket tube 71a becomes approximately $-180°$ C. As described above, the pressure regulating valve 81a controls the internal pressure of the jacket tube 71a to 0.4 MPa so that the temperature of the liquid nitrogen in the jacket tube 71a is maintained at approximately $-180°$ C. The nitrogen gas discharged through the pressure regulating valve 81a is led to a nitrogen buffer tank 210 (See FIG. 4), which will be described later.

When the liquid nitrogen in the jacket tube 71a is evaporated and discharged, the liquid nitrogen in the jacket tube 71a decreases. Thus, the flow rate control valve 78a controls the supply flow rate of the liquid nitrogen from the liquid nitrogen supply source 76 to the jacket tube 71a on the basis of a detection result of the liquid level meter 74a so that the liquid level of the liquid nitrogen in the jacket tube 71a is maintained constant on the basis of a detection result of the liquid level meter 74a.

An insulating material or a vacuum insulation layer for heat-retention may be provided outside the jacket tube 71a in order to suppress heat transfer between the jacket tube 71a and the outside.

Since the inner tube 61a is cooled by the jacket tube 71a to a temperature not lower than the boiling point of fluorine and not higher than the melting point of hydrogen fluoride, only hydrogen fluoride mixed in the fluorine gas is coagulated in the inner tube 61a, and the fluorine gas passes through the inner tube 61a. Since the fluorine gas is continuously led from the electrolytic cell 1 into the inner tube 61a, the coagulated hydrogen fluoride accumulates in the inner tube 61a as time elapses. If the accumulated amount of the coagulated hydrogen fluoride reaches a predetermined amount, the operation of the first refining device 16a is stopped, the second refining device 16b in the standby state is started, and operation of the refining device 16 is switched. The operation switching will be described later in detail.

Whether or not the accumulated amount of the coagulated hydrogen fluoride has reached the predetermined amount is determined on the basis of a detection result of a differential pressure meter 86a provided between the inlet passage 63a and the outlet passage 65a of the inner tube 61a, that is, a differential pressure between the inlet and the outlet of the inner tube 61a. If the differential pressure between the inlet and the outlet of the inner tube 61a reaches the predetermined value, it is determined that the accumulated amount of the coagulated hydrogen fluoride in the inner tube 61a has reached the predetermined amount, and the first refining device 16a is stopped. The differential pressure meter 86a corresponds to an accumulated state detector which detects an accumulated state of the hydrogen fluoride in the inner tube 61a. The accumulated state of the hydrogen fluoride in the inner tube 61a may be detected by the pressure meter 69a instead of the differential pressure meter.

The first refining device 16a is stopped by closing the inlet valve 64a and the outlet valve 66a of the inner tube 61a. After the first refining device 16a is stopped, it is necessary to discharge the coagulated hydrogen fluoride accumulated in the inner tube 61a and to bring the first refining device 16a into the standby state. That is, a regeneration process of the first refining device 16a needs to be performed.

Subsequently, a system for performing the regeneration process of the first refining device 16a will be described.

A liquid nitrogen discharge passage 90a for discharging the liquid nitrogen in the jacket tube 71a is connected to the bottom part of the jacket tube 71a. A discharge valve 91a that can discharge the liquid nitrogen in the jacket tube 71a by being opened is provided in the liquid nitrogen discharge passage 90a. The liquid nitrogen discharged through the discharge valve 91a is led to the nitrogen buffer tank 210 (See FIG. 4). Moreover, a nitrogen gas supply passage 93a which leads the nitrogen gas supplied from a nitrogen gas supply source 92 into the jacket tube 71a is connected to the downstream of the flow rate control valve 78a in the liquid nitrogen supply passage 77a. A shut-off valve 94a which switches between supply and shut-off of the nitrogen gas into the jacket tube 71a is provided in the nitrogen gas supply passage 93a. The supply of the nitrogen gas from the nitrogen gas supply source 92 to the jacket tube 71a is performed in a state in which the discharge valve 91a is fully open and the flow rate control valve 78a is fully closed. As the nitrogen gas, a gas at a normal temperature is used.

As described above, in the jacket tube 71a, the nitrogen gas at a normal temperature is supplied therein while liquid nitrogen is discharged. As a result, the temperature of the inner tube 61a is raised, and the coagulated hydrogen fluoride is dissolved with that.

A discharge passage 95a for discharging the dissolved hydrogen fluoride to the outside is connected to the downstream of the inlet valve 64a in the inlet passage 63a. A discharge pump 96 for suctioning and conveying the dissolved hydrogen fluoride in the jacket tube 71a is provided in the discharge passage 95a, and a discharge valve 97a opened when the hydrogen fluoride is discharged is provided upstream of the discharge pump 96. Moreover, an abatement unit 98 is provided downstream of the discharge pump 96 in the discharge passage 95a, and hydrogen fluoride conveyed by the discharge pump 96 is rendered harmless in the abatement unit 98 and emitted.

A nitrogen gas supply passage 99a which leads the nitrogen gas supplied from the nitrogen gas supply source 92 into the inner tube 61a is connected to the upstream of the outlet valve 66a in the outlet passage 65a. A shut-off valve 87a which switches between supply and shut-off of the nitrogen gas to the inner tube 61a is provided in the nitrogen gas supply passage 99a. The supply of the nitrogen gas from the nitrogen gas supply source 92 to the inner tube 61a is performed in a state in which the discharge valve 97a is fully open and the discharge pump 96 has been started.

As described above, in the inner tube 61a, the dissolved hydrogen fluoride is sucked therefrom by the discharge pump 96, while the nitrogen gas at a normal temperature is supplied therein. As a result, the hydrogen fluoride in the inner tube 61a is discharged. The discharge from the inner tube 61a by the discharge pump 96 is performed until the internal pressure of the inner tube 61a detected by the pressure meter 69a falls below the atmospheric pressure.

The hydrogen fluoride in the inner tube 61a discharged by the discharge pump 96 may be re-used by being returned to the hydrogen fluoride supply source 40 or the electrolytic cell 1.

After the hydrogen fluoride in the inner tube 61a is discharged, the fluorine gas is filled into the inner tube 61a. This is done so that the operation can be quickly switched to the first refining device 16a, if the accumulated amount of the coagulated hydrogen fluoride in the inner tube 61a reaches a predetermined amount while the second refining device 16b is operating.

The filling of the fluorine gas into the inner tube 61a is performed through the fluorine gas supply passage 54 connected to the second buffer tank 50 and whose downstream end portion is connected to the downstream of the inlet valve 64a in the inlet passage 63a. A shut-off valve 88a which opens when the fluorine gas is to be filled into the inner tube 61a is provided in the fluorine gas supply passage 54.

The internal pressure of the second buffer tank 50 is controlled by the pressure regulating valve 51 to a pressure higher than the atmospheric pressure, and thus, the fluorine gas retained in the second buffer tank 50 is supplied into the inner tube 61a by the differential pressure between the second buffer tank 50 and the inner tube 61a. As described above, the fluorine gas retained in the second buffer tank 50 is used for the filling of the fluorine gas into the inner tube 61a.

Subsequently, an operation of the refining device 16 configured as above will be described. The following operation of the refining device 16 is controlled by a controller (not shown) mounted on the fluorine gas generating apparatus 100. The controller controls operations of each valve and each pump on the basis of detection results of the thermometer 68a, the pressure meter 69a, the liquid level meter 74a, the pressure meter 80a, and the differential pressure meter 86a.

The case in which the first refining device 16a is in the operating state and the second refining device 16b is in the standby state will be described. In the first refining device 16a, the inlet valve 64a and the outlet valve 66a of the inner tube 61a is in the open state, and the fluorine gas is continuously led from the electrolytic cell 1 into the inner tube 61a. On the other hand, in the second refining device 16b, an inlet valve 64b and an outlet valve 66b of the inner tube 61b are in the closed state, and the fluorine gas is filled in the inner tube 61b. As described above, the fluorine gas generated in the electrolytic cell 1 is supplied only to the first refining device 16a.

In the following, the first refining device 16a in the operating state will be described.

The liquid nitrogen led through the liquid nitrogen supply passage 77a is retained in the jacket tube 71a of the first refining device 16a, and the inner tube 61a is cooled by the liquid nitrogen. The internal pressure of the jacket tube 71a is controlled by the pressure regulating valve 81a to 0.4 MPa. As a result, the temperature of the liquid nitrogen in the jacket tube 71a is maintained at approximately −180° C. which is the temperature not lower than the boiling point of fluorine and not higher than the melting point of hydrogen fluoride, and thus, only the hydrogen fluoride is coagulated in the inner tube 61a, while the fluorine gas passes through the inner tube 61a and is conveyed by the first pump 17 to the first buffer tank 21.

Here, the fluorine gas generated in the electrolytic cell 1 flows into the inner tube 61a through the inlet passage 63a and flows out through the conduit 67a and the outlet passage 65a. A lower end opening portion of the conduit 67a is located in the vicinity of the bottom part of the inner tube 61a, and thus, the fluorine gas flows in from the upper part of the inner tube 61a and flows out of the lower part of the inner tube 61a. Therefore, the fluorine gas is sufficiently cooled while passing through the inner tube 61a, and thus, hydrogen fluoride in the fluorine gas can be reliably coagulated and the hydrogen fluoride can be completely removed.

Since the fluorine gas is continuously led from the electrolytic cell 1 into the inner tube 61a, the liquid nitrogen in the jacket tube 71a for cooling the fluorine gas is also continuously evaporated. The evaporated nitrogen gas is discharged to the nitrogen buffer tank 210 (See FIG. 4) through the nitrogen gas discharge passage 79a.

If the accumulated amount of the coagulated hydrogen fluoride in the inner tube 61a increases and the differential pressure between the inlet and the outlet of the inner tube 61a detected by the differential pressure meter 86a reaches the predetermined value, the operation of the first refining device 16a is stopped, and the second refining device 16b in the standby state is started so that operation of the refining device 16 is switched. In the first refining device 16a, the regeneration process is performed after the operation is stopped.

Figure 3:
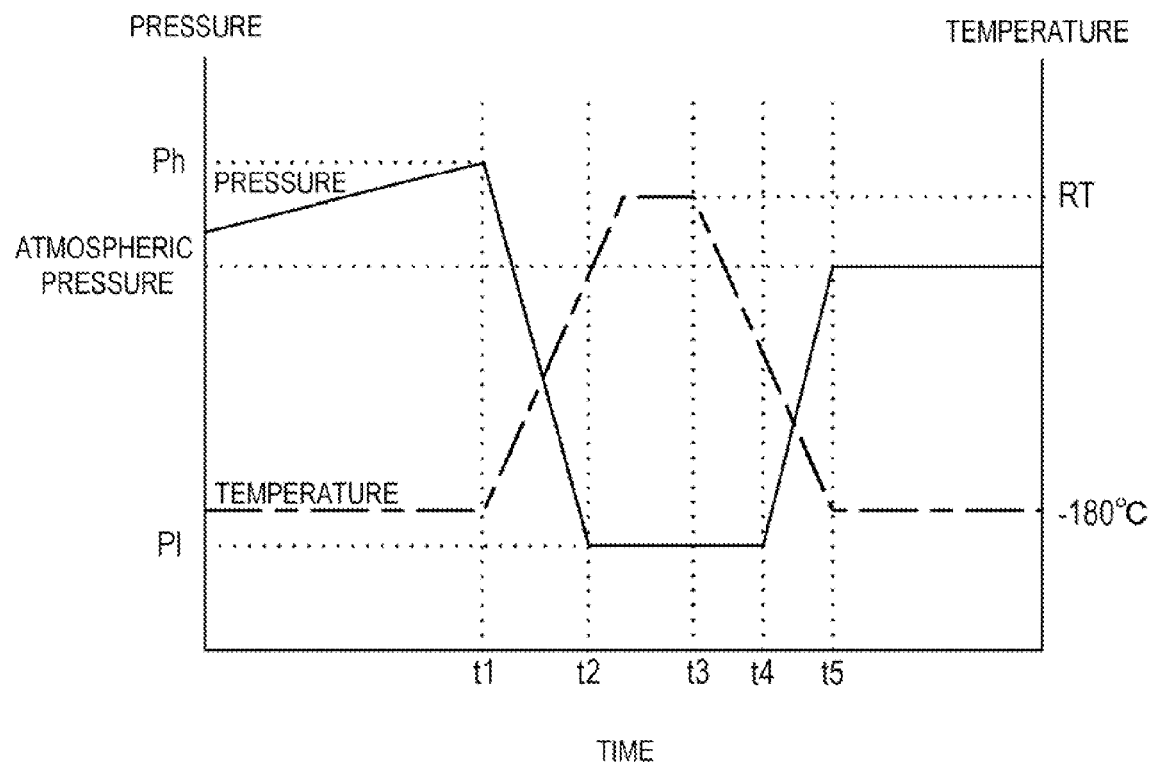
FIG. 3 is a graph illustrating changes of a pressure and a temperature in an inner tube of the refining device over time, in which a solid line indicates the pressure and a one-dot chain line indicates the temperature.

The operation switching process from the first refining device 16a to the second refining device 16b and the regeneration process of the first refining device 16a will be described below by referring to FIG. 3. FIG. 3 is a graph illustrating temporal changes of the pressure and the temperature in the inner tube 61a of the first refining device 16a, in which a solid line indicates the pressure, and a one-dot chain line indicates the temperature. The pressure illustrated in FIG. 3 is detected by the pressure meter 69a, and the temperature is detected by the thermometer 68a.

As illustrated in FIG. 3, if the accumulated amount of the coagulated hydrogen fluoride in the inner tube 61a increases, the internal pressure of the inner tube 61a rises. If the internal pressure of the inner tube 61a reaches the predetermined pressure (Ph) and the differential pressure between the inlet and the outlet of the inner tube 61a detected by the differential pressure meter 86a reaches the predetermined value, the operation is switched from the first refining device 16a to the second refining device 16b (time t1). Specifically, after the inlet valve 64b and the outlet valve 66b of the inner tube 61b of the second refining device 16b are opened, the inlet valve 64a and the outlet valve 66a of the inner tube 61a of the first refining device 16a are closed. As a result, the second refining device 16b is started, while the first refining device 16a is stopped, and the fluorine gas from the electrolytic cell 1 is led to the second refining device 16b.

In the stopped first refining device 16a, the liquid nitrogen is discharged from the jacket tube 71a. Specifically, the flow rate control valve 78a of the liquid nitrogen supply passage 77a is fully closed, and the supply of the liquid nitrogen to the jacket tube 71a is stopped and then, the discharge valve 91a is opened, and the liquid nitrogen is discharged to the nitrogen buffer tank 210 (See FIG. 4) through the liquid nitrogen discharge passage 90a. Here, if the pressure of the nitrogen buffer tank 210 is higher than the pressure of the jacket tube 71a, the pressure regulating valve 81a may be opened so as to lead the nitrogen gas in the nitrogen buffer tank 210 to the jacket tube 71a through the nitrogen gas discharge passage 79a and to promote discharge of the liquid nitrogen in the jacket tube 71a. After that, the shut-off valve 94a of the nitrogen gas supply passage 93a is opened, and the nitrogen gas at a normal temperature is supplied to the jacket tube 71a. As a result, as illustrated in FIG. 3, the temperature in the inner tube 61a rises to the normal temperature, and hydrogen fluoride in the inner tube 61a is dissolved.

During the process in which the temperature in the inner tube 61a rises, the discharge valve 97a of the discharge passage 95a is opened, and the discharge pump 96 is started. As a result, the dissolved hydrogen fluoride in the inner tube 61b is sucked by the discharge pump 96 and conveyed to the abatement unit 98. Moreover, at the same time, the shut-off valve 87a of the nitrogen gas supply passage 99a is opened, and the nitrogen gas at a normal temperature is supplied into the inner tube 61a. As described above, in the inner tube 61a, the dissolved hydrogen fluoride is discharged while the nitrogen gas at a normal temperature is being supplied therein. If the internal pressure of the inner tube 61a has fallen to a predetermined pressure (P1) not higher than the atmospheric pressure (time t2), it is determined that the discharge of the hydrogen fluoride in the inner tube 61a is completed, and the discharge valve 97a of the discharge passage 95a and the shut-off valve 87a of the nitrogen gas supply passage 99a are fully closed. Then, the discharge of the hydrogen fluoride in the inner tube 61a is completed.

After the discharge of hydrogen fluoride in the inner tube 61a is completed, the liquid nitrogen is supplied into the jacket tube 71a so as to bring the first refining device 16a into the standby state, and the fluorine gas is supplied into the inner tube 61b. Specifically, the liquid nitrogen is supplied into the jacket tube 71a (time t3) while the discharge valve 91a and the shut-off valve 94a of the nitrogen gas supply passage 93a are fully closed and the flow rate control valve 78a of the liquid nitrogen supply passage 77a is opened again. As a result, the internal temperature of the inner tube 61a is lowered. Since the internal pressure of the jacket tube 71a is controlled by the pressure regulating valve 81a to 0.4 MPa, the internal temperature of the inner tube 61a is lowered to approximately −180° C. and maintained. Moreover, in the process of lowering of the internal temperature of the inner tube 61a, the shut-off valve 88a of the fluorine gas supply passage 54 is opened, and the fluorine gas of the second buffer tank 50 is supplied into the inner tube 61a (time t4). The internal pressure of the inner tube 61a is raised by the supply of the fluorine gas into the inner tube 61a and when it rises to the atmospheric pressure, the shut-off valve 88a is closed, and the supply of the fluorine gas is stopped. The filling of the fluorine gas into the inner tube 61a is performed as above. In this way, the regeneration process of the first refining device 16a is finished, and the first refining device enters the standby state (time t5).

As described above, the fluorine gas of the second buffer tank 50 is used for the fluorine gas supplied into the inner tube 61a during the regeneration process. The second buffer tank 50 is a tank for retaining the fluorine gas discharged with control of the internal pressure of the first buffer tank 21. That is, in the regeneration process, the fluorine gas which used to be discharged to the outside from the first buffer tank 21 is retained in the second buffer tank 50 and the retained fluorine gas is used. As described above, as the fluorine gas supplied into the inner tube 61a in the regeneration process, the gas having been emitted to the outside is used.

As described above, the first refining device 16a during stop has the inner tube 61a cooled to −180° C. and also is in the standby state in which the fluorine gas is filled in the inner tube 61a. Therefore, if the differential pressure between the inlet and the outlet of the inner tube 61b in the second refining device 16b during operation reaches a predetermined value, the operation of the second refining device 16b is stopped and the first refining device 16a is quickly started so that the operation of the refining device 16 can be switched.

Figure 4:
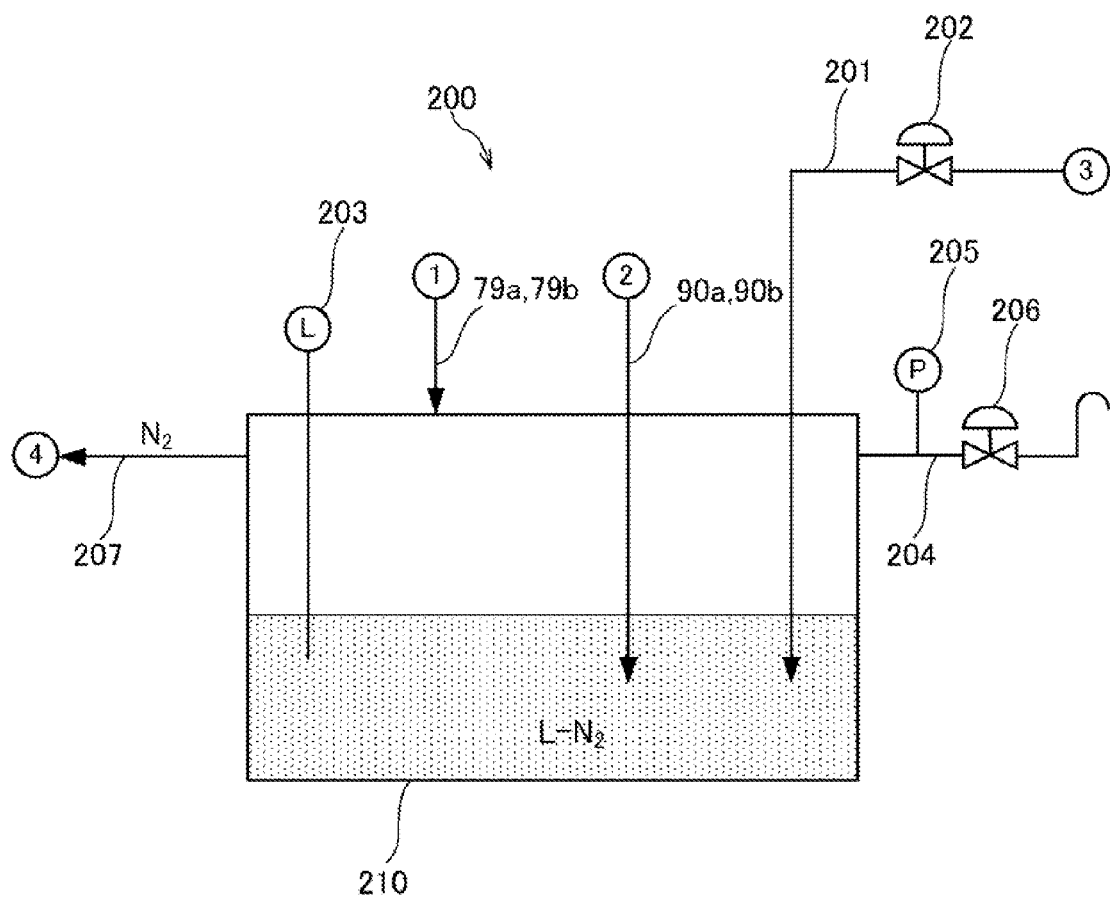
FIG. 4 is a system diagram of a nitrogen recovery facility.

Subsequently, a nitrogen recovery facility 200 attached to the refining device 16 will be described by referring to FIG. 4.

The nitrogen recovery facility 200 recovers the nitrogen gas and the liquid nitrogen used for coagulation of the hydrogen fluoride gas in the cooling devices 70a and 70b of the refining device 16 and discharged and supplies the nitrogen gas as a utility gas used at each spot in the fluorine gas generating apparatus 100.

The nitrogen recovery facility 200 is provided with the nitrogen buffer tank 210 for recovering the nitrogen gas and the liquid nitrogen used for coagulation of the hydrogen fluoride gas in the cooling devices 70a and 70b of the refining device 16 and discharged and for temporarily storing them.

To the nitrogen buffer tank 210, the lower ends of the nitrogen gas discharge passages 79a and 79b and the lower ends of the liquid nitrogen discharge passages 90a and 90b are connected. Therefore, in the nitrogen buffer tank 210, the nitrogen gas discharged from the jacket tubes 71a and 71b is recovered through the nitrogen gas discharge passage 79a and 79b, and the liquid nitrogen discharged from the jacket tubes 71a and 71b is recovered through the liquid nitrogen discharge passages 90a and 90b.

The nitrogen buffer tank 210 is arranged below the jacket tubes 71a and 71b, and thus, the liquid nitrogen in the jacket tubes 71a and 71b is discharged by gravity to the nitrogen buffer tank 210 by opening the discharge valves 91a and 91b of the liquid nitrogen discharge passages 90a and 90b. However, the nitrogen buffer tank 210 may be arranged at the same level as the jacket tubes 71a and 71b or above the jacket tubes 71a and 71b. In that case, in order to discharge the liquid nitrogen in the jacket tubes 71a and 71b into the nitrogen buffer tank 210, pumps need to be provided in the liquid nitrogen discharge passages 90a and 90b. Alternatively, the liquid nitrogen in the jacket tubes 71a and 71b may be discharged into the nitrogen buffer tank 210 by pressurizing gas phase parts in the jacket tubes 71a and 71b instead of providing pumps.

To the nitrogen buffer tank 210, the downstream end of a branch liquid nitrogen supply passage 201 branching from the liquid nitrogen supply passage 77a (See FIG. 2) connected to the liquid nitrogen supply source 76 is also connected. In the branch liquid nitrogen supply passage 201, a flow rate control valve 202 which controls the liquid level of the liquid nitrogen retained in the nitrogen buffer tank 210 to a predetermined level set in advance by controlling the supply flow rate of the liquid nitrogen to the nitrogen buffer tank 210 from the liquid nitrogen supply source 76 is provided.

The inside of the nitrogen buffer tank 210 is formed of two layers, that is, the liquid nitrogen and the nitrogen gas, and the liquid level of the liquid nitrogen is detected by a liquid level meter 203 as a liquid level detector. The flow rate control valve 202 controls the supply flow rate of the liquid nitrogen so that the liquid level of the liquid nitrogen in the nitrogen buffer tank 210 becomes a predetermined level set in advance on the basis of a detection result of the liquid level meter 203.

Here, if the nitrogen gas discharge passages 79a and 79b are arranged so that the downstream ends thereof are inserted into the liquid in the nitrogen buffer tank 210, the nitrogen gas recovered through the nitrogen gas discharge passages 79a and 79b is introduced into the liquid, and the liquid level of the liquid nitrogen in the nitrogen buffer tank 210 might roll. Thus, it becomes difficult to detect the liquid level of the liquid nitrogen in the nitrogen buffer tank 210 by the liquid level meter 203 with accuracy. Therefore, the nitrogen gas discharge passages 79a and 79b are, as illustrated in FIG. 4, preferably arranged so that the nitrogen gas is introduced to the gas phase part of the nitrogen buffer tank 210.

To the nitrogen buffer tank 210, an emission passage 204 for emitting the internal nitrogen gas to the atmosphere is connected. Moreover, in the emission passage 204, a pressure meter 205 which detects an internal pressure of the nitrogen buffer tank 210 and a pressure control valve 206 which controls the internal pressure of the nitrogen buffer tank 210 are provided. The pressure control valve 206 executes control so that the internal pressure of the nitrogen buffer tank 210 becomes a predetermined pressure set in advance on the basis of a detection result of the pressure meter 205. Specifically, control is executed so that the internal pressure of the nitrogen buffer tank 210 becomes 0.4 MPa, and if the internal pressure is 0.4 MPa or more, the valve is opened, and the internal nitrogen gas is emitted to the atmosphere through the emission passage 204.

As described above, the nitrogen gas and the liquid nitrogen used for coagulation of the hydrogen fluoride gas in the cooling devices 70a and 70b of the refining device 16 and discharged are recovered in the nitrogen buffer tank 210, and the recovered nitrogen gas and the liquid nitrogen are stored in a state in which the liquid level and the internal pressure of the nitrogen buffer tank 210 are controlled.

A utility gas supply passage 207 for supplying the internal nitrogen gas as a utility gas used at each spot in the fluorine gas generating apparatus 100 is connected to the nitrogen buffer tank 210.

The utility gas supply passage 207 is branched into plurality of branches on the way the middle, and the nitrogen gas is used at each spot in the fluorine gas generating apparatus 100. The nitrogen gas is used at spots as follows.

(1) The nitrogen gas is supplied to the upstream of the shut-off valve 47 in the carrier gas supply passage 46 and re-used as an entrained gas for leading hydrogen fluoride into the molten salt (See FIG. 1).

(2) The nitrogen gas is used as a nitrogen gas to be purged into the molten salt in the electrolytic cell 1 through the insertion pipe 13a of the liquid level meter 13 (See FIG. 1).

(3) The nitrogen gas is supplied to the second gas chamber 12a and re-used as a diluent gas for lowering concentration of the hydrogen gas to prevent explosion (See FIG. 1). The supply destination of the diluent gas is not limited to the second gas chamber 12a but may be supplied anywhere in the byproduct gas processing system 3.

(4) The nitrogen gas is supplied to the upstream of the shut-off valves 94a and 94b in the nitrogen gas supply passages 93a and 93b and re-used as a gas for extracting the liquid nitrogen from insides of the jacket tubes 71a and 71b

Figure 2:
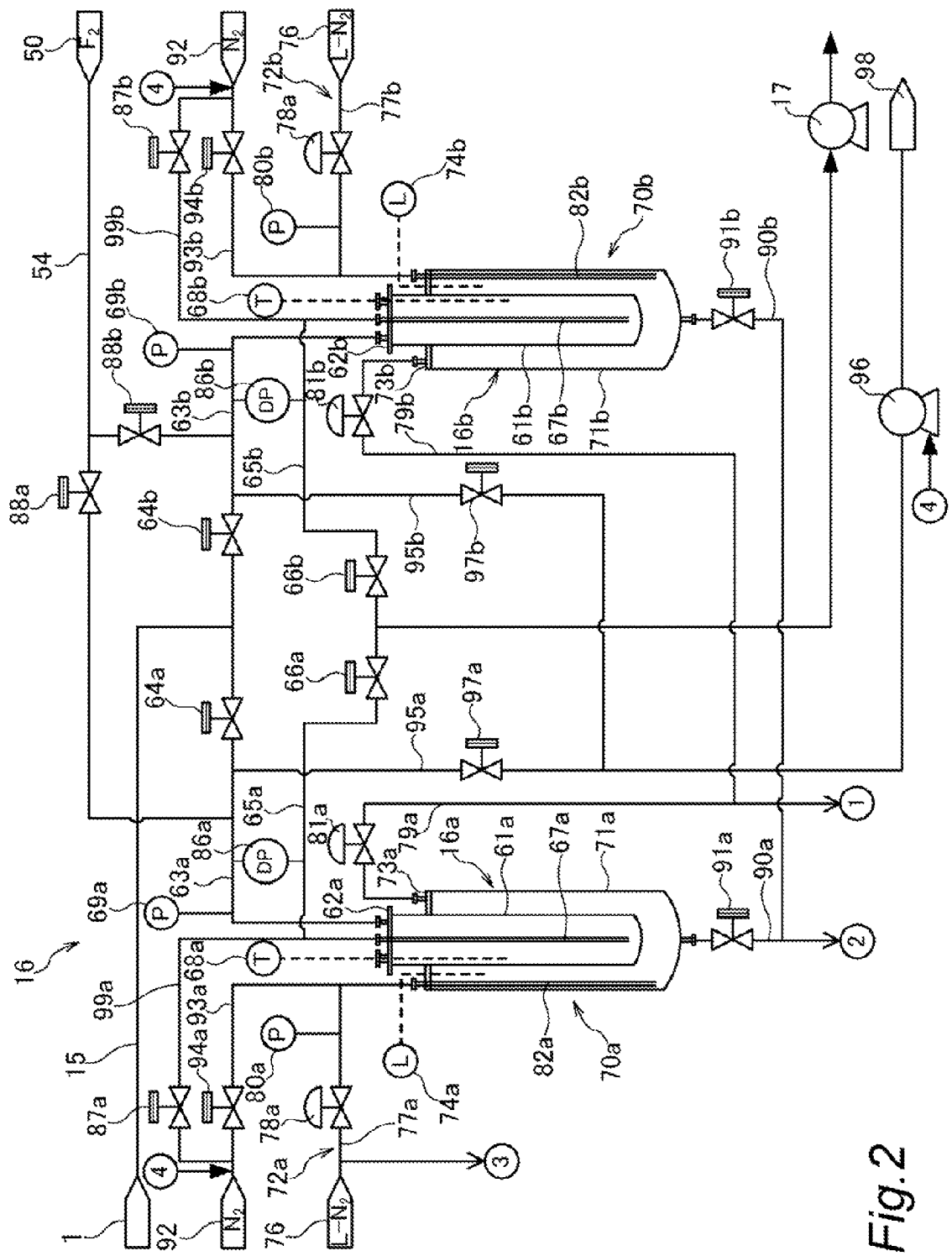
FIG. 2 is a system diagram of a refining device.

(See FIG. 2). Moreover, the nitrogen gas is supplied to the upstream of the shut-off valves 87a and 87b in the nitrogen gas supply passages 99a and 99b and re-used as a gas for extracting the hydrogen fluoride in the inner tubes 61a and 61b (See FIG. 2).

(5) The nitrogen gas is supplied to the downstream of the flow meter 26 in the first main passage 15 and re-used as a diluent gas of the fluorine gas (See FIG. 1).

(6) The nitrogen gas is re-used as an operating gas for driving the discharge pump 96 for sucking in the dissolved hydrogen fluoride in the jacket tube 71a (See FIG. 2).

As described above, the nitrogen gas and the liquid nitrogen temporarily stored in the nitrogen buffer tank 210 is re-used as a utility gas at each spot in the fluorine gas generating apparatus 100.

According to the above embodiment, the following working effects are exerted.

The nitrogen gas and the liquid nitrogen used for coagulation of the hydrogen fluoride gas in the refining device 16 and discharged are not emitted to the outside but re-used as a utility gas used at each spot in the fluorine gas generating apparatus 100. Therefore, the liquid nitrogen used for refining the fluorine gas can be effectively utilized.

Another embodiment will be described below.

(1) In the above-described embodiment, the nitrogen gas and the liquid nitrogen discharged from the cooling devices 70a and 70b of the refining device 16 are recovered in the nitrogen buffer tank 210 and then, the nitrogen gas is re-used at each spot in the fluorine gas generating apparatus 100. Instead, the nitrogen gas and the liquid nitrogen discharged from the cooling devices 70a and 70b may be directly re-used at each spot in the fluorine gas generating apparatus 100. In that case, it is necessary to gasify the liquid nitrogen by providing a heater on the downstream sides of the liquid nitrogen discharge passages 90a and 90b and heating the liquid nitrogen. However, with the method of recovering the nitrogen gas and the liquid nitrogen discharged from the cooling devices 70a and 70b in the nitrogen buffer tank 210, the nitrogen gas can be supplied stably to each spot, and thus, it is more preferable than the method of direct use.

(2) In the above-described embodiment, the liquid nitrogen is used as a cooling medium used in the refining device 16. However, the cooling medium is not limited to the liquid nitrogen but liquid argon or the like may be used.

(3) The above-described embodiment is configured by two systems by arranging two units of the refining devices 16 in parallel, but three units or more of the refining devices 16 may be arranged in parallel so as to configure three or more systems.

(4) In the above-described embodiment, a gas retained in the second buffer tank 50 is used as the fluorine gas used in the regeneration process. Instead, as the fluorine gas used in the regeneration process, the fluorine gas retained in the first buffer tank 21 may be used. In that case, the fluorine gas supply passage 54 is connected to the first buffer tank 21. However, in this case, the pressure in the first buffer tank 21 may easily fluctuate, and the pressure of the fluorine gas to be supplied to the external device 4 might fluctuate. Therefore, as in the above-described embodiment, the fluorine gas retained in the second buffer tank 50 is preferably used as the fluorine gas used in the regeneration process.

The embodiments of the present invention have been described above, but the embodiments only illustrate a part of application examples of the present invention, and the technical scope of the present invention is not intended to be limited by the specific configurations of the above-described embodiments.

This application claims priority on the basis of Japanese Patent Application No. 2010-532 filed with Japan Patent Office on Jan. 5, 2010 and the whole contents of this application is incorporated in this description by reference.

What is claimed is:

1. A fluorine gas generating apparatus which generates a fluorine gas by electrolyzing hydrogen fluoride in molten salt, comprising:
    an electrolytic cell in which the molten salt is retained and which is separated and divided above the liquid level of the molten salt into a first gas chamber into which a product gas mainly containing a fluorine gas generated at an anode immersed in the molten salt is led and a second gas chamber into which a byproduct gas mainly containing a hydrogen gas generated at a cathode immersed in the molten salt is led; and
    a refining device which refines the fluorine gas by coagulating with a cooling medium and trapping a hydrogen fluoride gas evaporated from the molten salt in the electrolytic cell and mixed in the product gas generated from the anode,
    wherein the refining device includes a buffer tank which recovers and temporarily stores cooling medium gas and liquid cooling medium used for coagulation of the hydrogen fluoride gas and discharged,
    wherein the refining device includes a pressure meter which detects an internal pressure of the buffer tank, and a pressure control valve which controls the internal pressure of the buffer tank, and
    wherein the cooling medium gas stored in the buffer tank is re-used as a utility gas used at spots in the fluorine gas generating apparatus.

2. A fluorine gas generating apparatus according to claim 1, further comprising a liquid cooling medium supply source,
    wherein the refining device includes a liquid level meter which detects a liquid level of the liquid cooling medium in the buffer tank, and a flow rate control valve which controls supply flow rate of liquid cooling medium to the buffer tank from the liquid cooling medium supply source on the basis of a detection result of the liquid level meter.

3. A fluorine gas generating apparatus according to claim 1, wherein the cooling medium is re-used as at least one of an entrained gas for leading hydrogen fluoride into the molten salt, a gas to be purged into the molten salt in the electrolytic cell, a diluent gas for lowering concentration of the hydrogen gas to prevent explosion, a gas for extracting the liquid nitrogen from inside of the refining device, a diluent gas of the fluorine gas, and an operating gas for driving a discharge pump for sucking in the dissolved hydrogen fluoride in the refining device.

4. A fluorine gas generating apparatus according to claim 1, wherein the refining device further comprises:
    a gas inflow unit into which the product gas containing the hydrogen fluoride gas flows; and
    a cooling device which cools the gas inflow unit at a temperature not lower than a boiling point of fluorine and not higher than a melting point of hydrogen fluoride so that the hydrogen fluoride gas mixed in the product gas coagulates while the fluorine gas passes through the gas inflow unit.

* * * * *